US012226775B2

(12) United States Patent
Wei et al.

(10) Patent No.: US 12,226,775 B2
(45) Date of Patent: Feb. 18, 2025

(54) MICROFLUIDIC CHIP AND MICROFLUIDIC SYSTEM

(71) Applicant: BOE TECHNOLOGY GROUP CO., LTD., Beijing (CN)

(72) Inventors: Qiuxu Wei, Beijing (CN); Yingying Zhao, Beijing (CN); Wenliang Yao, Beijing (CN); Bolin Fan, Beijing (CN); Le Gu, Beijing (CN); Yongjia Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 884 days.

(21) Appl. No.: 17/419,970

(22) PCT Filed: Sep. 25, 2020

(86) PCT No.: PCT/CN2020/117743

§ 371 (c)(1),
(2) Date: Jun. 30, 2021

(87) PCT Pub. No.: WO2022/061713

PCT Pub. Date: Mar. 31, 2022

(65) Prior Publication Data

US 2022/0314223 A1 Oct. 6, 2022

(51) Int. Cl.

| | |
|---|---|
| ***B01L 3/00*** | (2006.01) |
| ***B01F 23/00*** | (2022.01) |
| ***B01F 23/41*** | (2022.01) |
| ***B01F 101/23*** | (2022.01) |
| ***B01L 9/00*** | (2006.01) |
| ***B23Q 17/24*** | (2006.01) |
| ***C07K 14/705*** | (2006.01) |
| ***C12M 1/34*** | (2006.01) |

(Continued)

(52) U.S. Cl.

CPC ... *B01L 3/502792* (2013.01); *B01L 2300/165* (2013.01); *B01L 2400/0424* (2013.01)

(58) Field of Classification Search

CPC ......... B01L 3/502792; B01L 2300/165; B01L 2400/0424; B01L 2300/0645

See application file for complete search history.

(56) References Cited

FOREIGN PATENT DOCUMENTS

| | | | | |
|---|---|---|---|---|
| CN | 109870801 A | * | 6/2019 | |
| CN | 109078661 B | * | 6/2020 | .......... B01L 3/50273 |

* cited by examiner

*Primary Examiner* — Jennifer Wecker
*Assistant Examiner* — Oyeleye Alexander Alabi
(74) *Attorney, Agent, or Firm* — Nath, Goldberg & Meyer; Joshua B. Goldberg

(57) ABSTRACT

An embodiment of the present disclosure provides a microfluidic chip, including: a first substrate; wherein the first substrate includes a first base, a first electrode layer on the first base; the first electrode layer includes a plurality of first electrodes at intervals along a first direction, wherein a cross-sectional shape of the first electrode parallel to the first base is a centrosymmetric shape, and the cross-sectional shape includes: a first boundary and a second boundary opposite to each other in the first direction; a shape of the first boundary is a centrosymmetric curve, a distance between two end points of the first boundary in a second direction perpendicular to the first direction is less than a length of the first boundary; the second boundary has a same shape and length as the first boundary, and the first and second boundaries are parallel to each other in the first direction.

20 Claims, 8 Drawing Sheets

(51) Int. Cl.

| | |
|---|---|
| ***C12Q 1/04*** | (2006.01) |
| ***C12Q 1/18*** | (2006.01) |
| ***C12Q 1/686*** | (2018.01) |
| ***G01N 21/17*** | (2006.01) |
| ***G01N 21/3577*** | (2014.01) |
| ***G01N 21/359*** | (2014.01) |
| ***G01N 21/39*** | (2006.01) |
| ***G01N 21/45*** | (2006.01) |
| ***G01N 21/64*** | (2006.01) |
| ***G01N 21/77*** | (2006.01) |
| ***G01N 21/78*** | (2006.01) |
| ***G01N 27/414*** | (2006.01) |
| ***G01N 30/12*** | (2006.01) |
| ***G01N 30/68*** | (2006.01) |
| ***G01N 30/70*** | (2006.01) |
| ***G01N 30/72*** | (2006.01) |
| ***G01N 30/88*** | (2006.01) |
| ***G01N 33/00*** | (2006.01) |
| ***G01N 33/18*** | (2006.01) |
| ***G01N 33/50*** | (2006.01) |
| ***G01N 33/53*** | (2006.01) |
| ***G01N 33/543*** | (2006.01) |
| ***G01N 33/68*** | (2006.01) |
| ***G01N 33/74*** | (2006.01) |
| ***G01N 35/00*** | (2006.01) |
| ***G01N 35/10*** | (2006.01) |
| ***G06T 7/00*** | (2017.01) |
| ***G06T 7/90*** | (2017.01) |
| ***H10K 10/46*** | (2023.01) |
| ***H10K 85/00*** | (2023.01) |
| ***H10K 85/20*** | (2023.01) |

MICROFLUIDIC CHIP AND MICROFLUIDIC SYSTEM

This is a National Phase Application filed under 35 U.S.C. 371 as a national stage of PCT/CN2020/117743, filed Sep. 25, 2020, the contents of which is incorporated herein by reference in its entirety.

TECHNICAL FIELD

The present disclosure relates to the field of microfluidic technology, and in particular to a microfluidic chip and a microfluidic system.

BACKGROUND

Micro Fluidics technology is an emerging interdiscipline related to chemistry, fluid physics, microelectronics, new materials, biology and biomedical engineering, and may realize a precise control and manipulation on micro liquid drops. Devices using microfluidic technology are generally called microfluidic chips, which are important components of lab-on-a-chip systems. Samples such as various cells may be cultured, moved, detected and analyzed in the microfluidic chips, so that the devices are widely applied to the chemical and medical fields, and are receiving more and more attention in other fields.

The mainstream driving mode for the microfluidic chip is electrode driving based on dielectric electrowetting technology, which is also called as a voltage type microfluidic chip, and the principle is as follows: the liquid drops are arranged on a surface with a lyophobic layer, and by means of the electrowetting effect, the wettability between the liquid drops and the lyophobic layer is changed by applying a voltage to the liquid drops, so that pressure difference and asymmetric deformation are generated inside the liquid drops, and further the directional movement of the liquid drops is realized.

SUMMARY

The present disclosure is directed to at least solve one of the technical problems in the prior art, and therefore provides a microfluidic chip and a microfluidic system.

In a first aspect, an embodiment of the present disclosure provides a microfluidic chip, including: a first substrate; wherein the first substrate includes a first base, a first electrode layer on the first base; the first electrode layer includes a plurality of first electrodes at intervals along a first direction, wherein a cross-sectional shape of the first electrode parallel to the first base is a centrosymmetric shape, and the cross-sectional shape includes: a first boundary and a second boundary opposite to each other in the first direction;

a shape of the first boundary is a centrosymmetric curve, a distance between two end points of the first boundary in a second direction perpendicular to the first direction is less than a length of the first boundary;

the second boundary has a same shape and length as the first boundary, and the first boundary and the second boundary are parallel to each other in the first direction.

In some embodiments, two end points of the first boundary are a first end point and a second end point, respectively, two end points of the second boundary are a third end point and a fourth end point, respectively, a connection line of the first end point and the third end point is parallel to the first direction, and a connection line of the second end point and the fourth end point is parallel to the first direction;

the cross-sectional shape of the first electrode parallel to the first base further includes: a third boundary and a fourth boundary opposite to each other in the second direction, wherein the third boundary is a line segment connecting the first end point and the third end point, and the fourth boundary is a line segment connecting the second end point and the fourth end point.

In some embodiments, a distance between the first end point and the third end point is a first distance;

a distance between the first end point and the second end point in the second direction is a second distance;

the first distance is equal to the second distance.

In some embodiments, two end points of the first boundary are a first end point and a second end point, respectively;

an extension direction of a connection line of the first end point and the second end point intersects with the second direction.

In some embodiments, during moving along the first boundary from the first end point to the second end point, a distance of a point on the first boundary away from a virtual reference line increases gradually or in steps; or during moving along the first boundary from the first end point to the second end point, the distance of the point on the first boundary away from the virtual reference line decreases gradually or in steps;

wherein the virtual reference line passes through a symmetrical center of the cross-sectional shape and is parallel to the second direction.

In some embodiments, the first boundary has an S-curve or a symmetrical S-curve.

In some embodiments, in a predetermined rectangular plane coordinate system, a curve function corresponding to the first boundary is:

$$S(y) = L*\left\{0.3*\left[1-\left(\frac{y}{L}\right)\right]^4 - 0.61*\left(\frac{y}{L}\right)\left[1-\left(\frac{y}{L}\right)\right]^3 + 0.61*\left(\frac{y}{L}\right)^3\left[1-\left(\frac{y}{L}\right)\right] - 0.3*\left(\frac{y}{L}\right)^4\right\}$$

or, $$S(y) = -L*\left\{0.3*\left[1-\left(\frac{y}{L}\right)\right]^4 - 0.61*\left(\frac{y}{L}\right)\left[1-\left(\frac{y}{L}\right)\right]^3 + 0.61*\left(\frac{y}{L}\right)^3\left[1-\left(\frac{y}{L}\right)\right] - 0.3*\left(\frac{y}{L}\right)^4\right\}$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values corresponding to the first coordinate axis and the second coordinate axis respectively corresponding to points on the first boundary, $0 \le y \le 1$, and L is a distance between the first end point and the second end point in the second direction.

In some embodiments, the first boundary has a shape of a broken line, including: a first line segment, a second line segment and a third line segment connected in sequence;

wherein the second line segment is parallel to the second direction.

In some embodiments, in the predetermined rectangular plane coordinate system, a curve function corresponding to the first boundary is:

$$S(y)=\begin{cases} L*\left[\frac{3}{10}-\frac{6}{7}*\left(\frac{y}{L}\right)\right] & 0\le y<\frac{7}{20}L \\ 0 & \frac{7}{20}L\le y<\frac{13}{20}L \\ -L*\left[\frac{3}{10}-\frac{6}{7}*\left(1-\frac{y}{L}\right)\right] & \frac{13}{20}L\le y\le L \end{cases}$$

or, $$S(y)=\begin{cases} -L*\left[\frac{3}{10}-\frac{6}{7}*\left(\frac{y}{L}\right)\right] & 0\le y<\frac{7}{20}L \\ 0 & \frac{7}{20}L\le y<\frac{13}{20}L \\ L*\left[\frac{3}{10}-\frac{6}{7}*\left(1-\frac{y}{L}\right)\right] & \frac{13}{20}L\le y\le L \end{cases}$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values corresponding to the first coordinate axis and the second coordinate axis respectively corresponding to points on the first boundary, and L is a distance between the first end point and the second end point in the second direction.

In some embodiments, the first boundary has a shape of a line segment.

In some embodiments, in the predetermined rectangular plane coordinate system, a curve function corresponding to the first boundary is:

$$S(y)=L*\left[\frac{3}{10}-\frac{3}{5}*\left(\frac{y}{L}\right)\right]$$

or, $$S(y)=-L*\left[\frac{3}{10}-\frac{3}{5}*\left(\frac{y}{L}\right)\right]$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values corresponding to the first coordinate axis and the second coordinate axis respectively corresponding to points on the first boundary, $0\le y\le 1$, and L is a distance between the first end point and the second end point in the second direction.

In some embodiments, it further including: a dielectric layer on a side of the first electrode layer distal to the first base, and a first lyophobic layer on a side of the dielectric layer distal to the first base.

In some embodiments, it further including a second substrate opposite to the first substrate, wherein the first electrode layer is on a side of the first base proximal to the second substrate;

the second substrate includes a second base, a second electrode layer on a side of the second substrate proximal to the first substrate, and a second lyophobic layer on a side of the second electrode layer proximal to the first substrate.

In a second aspect, the embodiment of the present disclosure also provides a microfluidic system, including: the microfluidic chip as provided in the first aspect above.

In some embodiments, the microfluidic chip is configured to control a flow of a liquid drop, and a contact surface of the liquid drop with the first substrate has a circular shape and a diameter d;

a distance between the first boundary and the second boundary in the first direction is L, and L and d satisfy:

$$1.15\le\frac{d}{L}\le 1.25.$$

DETAIL DESCRIPTION OF EMBODIMENTS

Specific embodiments of the present disclosure are described in further detail below with reference to the accompanying drawings and embodiments. The following embodiments are intended to illustrate the present disclosure, but are not intended to limit the scope of the present disclosure. It should be noted that the embodiments and features of the embodiments in the present disclosure may be arbitrarily combined with each other without conflict.

Figure 1:
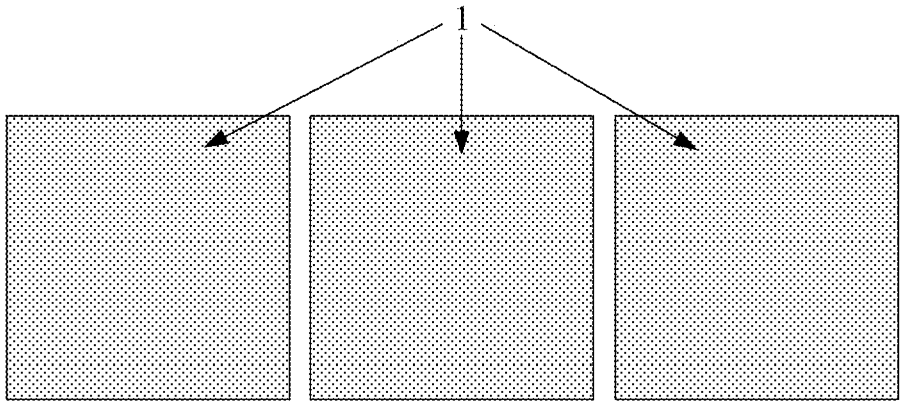
FIG. 1 is a schematic top view of three electrodes which are arranged side by side in a microfluidic chip in the related art.

FIG. 1 is a schematic top view of three electrodes that are arranged side by side in a microfluidic chip in the related art. As shown in FIG. 1, in the related art, the electrodes 1 for driving liquid drops to move in the microfluidic chip are square electrodes 1, which are arranged along a driving path (an extension direction of the driving path is exemplarily shown in FIG. 1 as a horizontal direction); for any two adjacent sides in the square, one of them is parallel to the extension direction of the driving path, and the other side is perpendicular to the extension direction of the driving path.

In practical applications, it is found that during driving the liquid drops to move along the driving path by using the electrodes 1 shown in FIG. 1, the "driving force" generated by the electrodes 1 acting on the liquid drops (the wettability between the liquid drop and the lyophobic layer is changed by the electric field formed by the electrode 1 to drive the liquid drop to flow) is insufficient, such that a flow speed of the liquid drops is slow, and thus, a manipulation performance for the chip is affected.

In order to interdigitated the "driving force" of the electrodes 1 acting on the liquid drops, a shape of the electrodes 1 is redesigned in the related art. Specifically, two sides of the electrode 1, which are oppositely arranged in the extension direction of the driving path, are designed to be special-shaped.

Figure 2:
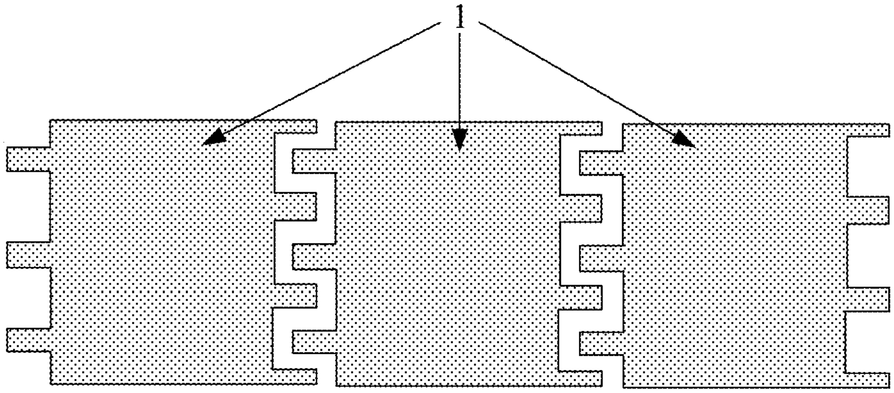
FIG. 2 is a schematic top view of three electrodes which are arranged side by side in a microfluidic chip in the related art.
Figure 3:
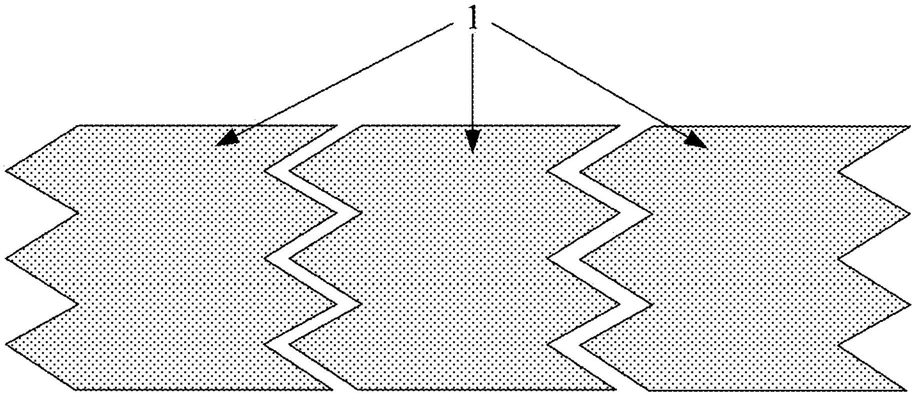
FIG. 3 is a schematic top view of three electrodes which are arranged side by side in a microfluidic chip in the related art.

FIG. 2 is a schematic top view of three electrodes that are arranged side by side in a microfluidic chip in the related art; FIG. 3 is a schematic top view of three electrodes that are arranged side by side in a microfluidic chip in the related art. As shown in FIGS. 2 and 3, two sides of the electrode 1 shown in FIG. 2, which are oppositely arranged in the extension direction of the driving path, are both interdigitated, and two sides of the electrode 1 shown in FIG. 3, which are oppositely arranged in the extension direction of the driving path, are both zigzag.

In practical applications, it is found that the technical solutions shown in FIGS. 2 and 3 may improve the "driving force" generated by the electrodes 1 acting on the liquid drops to some extent, but the interdigitated electrode 1 and the zigzag electrode 1 are asymmetric structures in a front-back direction of the driving path, so that bidirectional (forward and backward) driving capabilities for the liquid drops are different, and thus, a manipulation consistency for the chip is affected.

In order to solve at least one of the technical problems in the related art, the present disclosure provides a corresponding technical solution.

Figure 4:
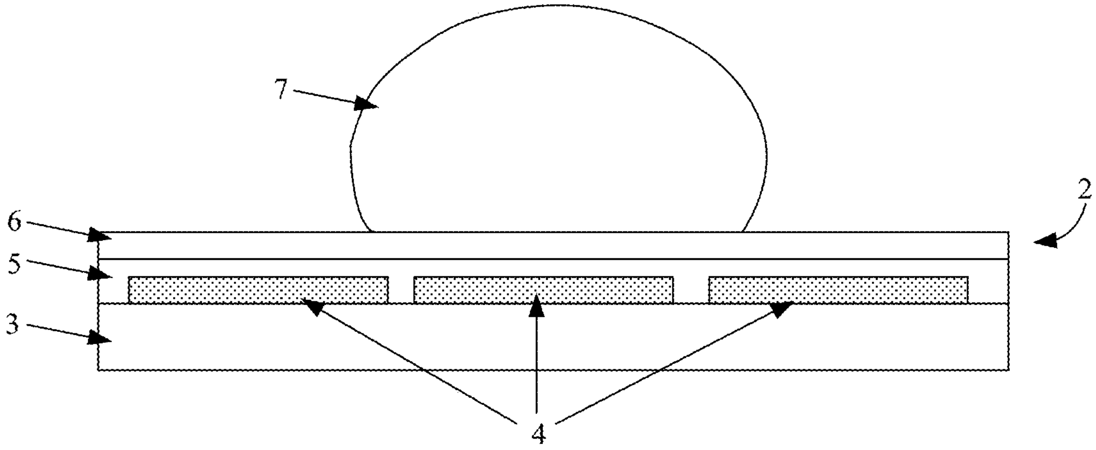
FIG. 4 is a schematic structural diagram of a microfluidic chip according to an embodiment of the present disclosure.
Figure 5:
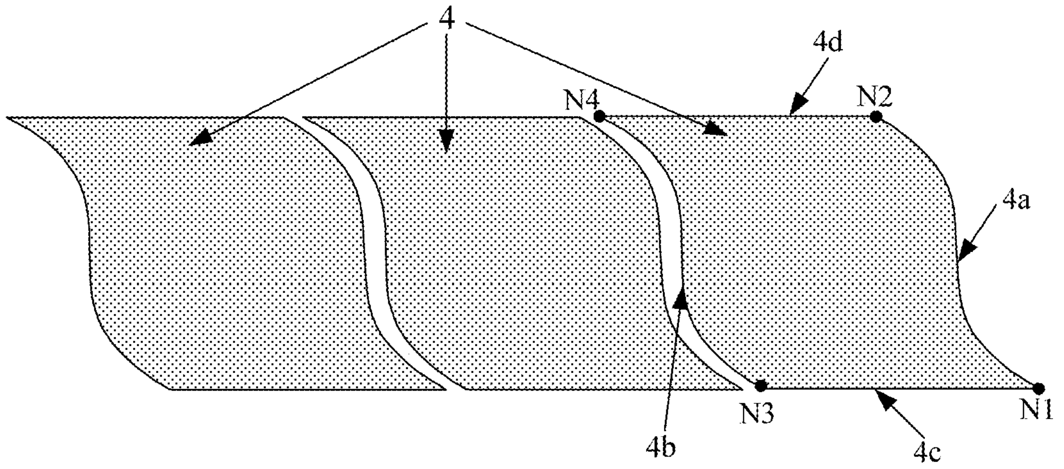
FIG. 5 is a schematic top view of three first electrodes which are arranged side by side in a microfluidic chip according to an embodiment of the present disclosure.

FIG. 4 is a schematic structural diagram of a microfluidic chip according to an embodiment of the present disclosure; FIG. 5 is a schematic top view of three first electrodes that are arranged side by side in a microfluidic chip according to an embodiment of the present disclosure. As shown in FIGS. 4 and 5, the microfluidic chip includes: a first substrate 2 including: a first base 3 and a first electrode layer; wherein the first electrode layer includes: a plurality of first electrodes 4 arranged at intervals along a first direction, a cross section of the first electrode 4 parallel to the first base 3 has a centrosymmetric shape, and the cross-sectional shape includes: a first boundary **4*a* and a second boundary 4*b* oppositely arranged in the first direction; a shape of the first boundary 4*a* is a centrosymmetric curve, a distance between two end points of the first boundary 4*a* in a second direction perpendicular to the first direction is less than a length of the first boundary 4*a*; the second boundary 4*b* has a same shape and length as the first boundary 4*a*, and the first boundary 4*a* and the second boundary 4*b*** are arranged in parallel in the first direction.

In some embodiments, the microfluidic chip further includes: a dielectric layer 5 and a first lyophobic layer 6. The first electrode layer is located on the first base 3, the dielectric layer 5 is located on a side of the first electrode layer distal to the first base 3, and the first lyophobic layer 6 is located on a side of the dielectric layer 5 distal to the first base 3.

In some embodiments, a material of the first lyophobic layer 6 may be a material having lyophobic properties, such as polytetrafluoroethylene; a material of the dielectric layer 5 may be polyethylene, polyvinylidene fluoride, vinylidene fluoride copolymer, or other materials having a relatively high dielectric constant.

In general, the first substrate 2 further includes: a wiring layer (not shown) generally disposed between the first base 3 and the first electrode layer, and including a plurality of signal wires for providing voltage signals to respective first electrodes 4. A specific structure of the wiring layer is conventional in the art and will not be described in detail here.

In some embodiments, a material of the first electrode 4 may be a metal material, such as molybdenum or aluminum; or a transparent conductive material, such as indium tin oxide, indium zinc oxide. The number of first electrodes 4 may be increased or decreased depending on a specific application. Only 3 first electrodes 4 are exemplarily shown in FIG. 5.

In the embodiment of the present disclosure, the first electrodes 4 are arranged along the driving path. That is, the "first direction" is parallel to the extension direction of the driving path, and the first direction is a flowing direction for controlling the liquid drops 7 to flow (move) in the microfluidic chip; the second direction is perpendicular to the extension direction of the driving path. In the case shown in FIG. 5, the first direction is specifically a horizontal direction and the second direction is specifically a vertical direction.

For convenience of description, as shown in FIGS. 4 and 5, the boundary located on the right side in each electrode is referred to as the first boundary **4*a*, and the boundary located on the left side is referred to as the second boundary 4*b*; the first boundary 4*a* and the second boundary 4*b* are of the same shape and length and are arranged in parallel in the first direction. That is, the first boundary 4*a* and/the second boundary 4*b* are translated in the first direction, such that the first boundary 4*a* and the second boundary 4*b* may completely overlap with each other. Taking the first boundary 4*a* as an example, if the distance between the two end points of the first boundary 4*a* in the second direction is L, the length of the first boundary 4*a* is greater than L. That is, the shape of the first boundary 4*a* is not necessarily a line segment parallel to the first direction, and the cross section of the first electrode 4 parallel to the first base 3** does not have a rectangular shape.

In the embodiment of the present disclosure, since the cross section of the first electrode 4 parallel to the first base 3 has the centrosymmetric shape, and the first boundary and the second boundary oppositely disposed in the first direction in the cross section both have the centrosymmetric shape, the first electrode 4 is a centrosymmetric structure in the front-back direction of the driving path, so that the bidirectional (forward and backward) driving capabilities of the first electrode 4 for the liquid drops 7 are the same, thereby ensuring the manipulation consistency for the chip. Compared with the conventional square electrode, in the embodiment of the present disclosure, the length of the first boundary 4*a* is greater than the distance between the two end points of the first boundary 4*a* in the second direction, which may effectively improve the driving capability of the electrodes for the liquid drops 7.

In some embodiments, the two end points of the first boundary 4*a* are a first end point N1 and a second end point N2, respectively, and the two end points of the second boundary 4*b* are a third end point N3 and a fourth end point N4, respectively. A connection line of the first end point N1 and the third end point N3 is parallel to the first direction, and a connection line of the second end point N2 and the fourth end point N4 is parallel to the first direction. The cross-sectional shape of the first electrode 4 parallel to the first base 3 further includes: a third boundary 4*c* and a fourth boundary 4*d* oppositely arranged in the second direction. The third boundary 4*c* is a line segment connecting the first end point N1 and the third end point N3, and the fourth boundary 4*d* is a line segment connecting the second end point N2 and the fourth end point N4.

In some embodiments, a distance between the first end point N1 and the third end point N3 is a first distance; a distance between the first end point N1 and the second end point N2 in the second direction is a second distance; the first distance is equal to the second distance. That is, a distance between the two end points of the first boundary 4*a* in the second direction is L, and the lengths of the third boundary 4*c* and the fourth boundary 4*d* are also L.

Figure 6:
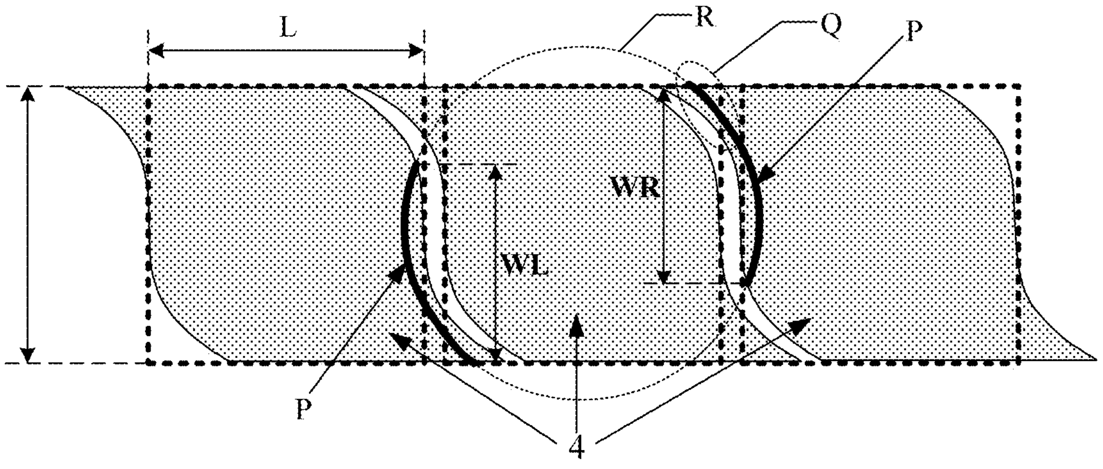
FIG. 6 is a schematic diagram showing a comparison between a region where the three adjacent first electrodes shown in FIG. 5 are located and a region where the three adjacent first electrodes shown in FIG. 1 are located.

FIG. 6 is a schematic diagram showing a comparison between a region where the three adjacent first electrodes shown in FIG. 5 are located and a region where the three adjacent first electrodes shown in FIG. 1 are located. As shown in FIG. 6, three dotted squares (with a side length L) in FIG. 6 are areas in the related art where three consecutively adjacent electrodes are located. In the embodiment of the present disclosure, since the shape of the first boundary 4*a* is not necessarily a line segment parallel to the first direction, the first electrode 4 necessarily includes a portion located outside a corresponding one of the dashed squares in the present disclosure; without considering that a distance between the adjacent dashed squares, the portion of the first electrode 4, which is located outside the corresponding dashed square, is necessarily located in the adjacent dashed square, and the driving capability of the first electrode 4 to which the portion belongs for the liquid drops 7 may be improved by the portion to a certain extent.

Taking a situation shown in FIG. 6 as an example, the rightmost first electrode 4 corresponds to the rightmost dashed square, and the rightmost first electrode 4 includes a portion Q located outside the rightmost dashed square. The portion Q is located in the middle dashed square, and the portion Q may effectively improve the driving capability of the rightmost first electrode 4 for the liquid drops 7.

Figure 7:
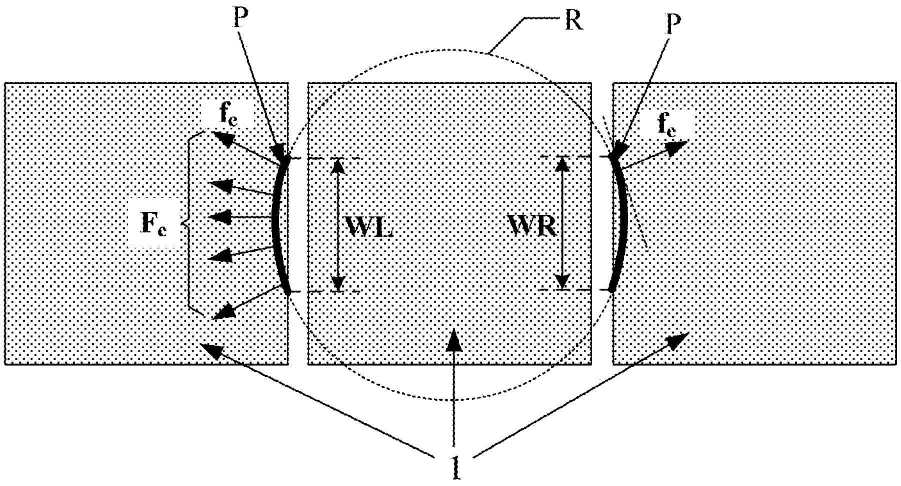
FIG. 7 is a schematic diagram of a dielectrophoretic force on liquid drops in the three electrodes that are arranged side by side shown in FIG. 1.

FIG. 7 is a schematic diagram of the dielectrophoretic force applied to liquid drops in three electrodes that are arranged side by side shown in FIG. 1. As shown in FIG. 7, a circle in FIG. 7 is a contact surface profile R of the liquid drop 7 with a first liquid transmission layer. An portion where the contact surface profile R of the liquid drop 7 with the first liquid transmission layer is overlapped with the nearest electrode 1 in a direction to be moved (the horizontal direction shown in FIG. 7, for example) is called a liquid drop-electrode contact line P. According to the principle of dielectric electrowetting, it may be seen that a magnitude of the generated unit dielectrophoretic force $f_e$ per unit length of the contact line P is:

$$f_e=\gamma_{lg}(\cos\theta-\cos\theta_0)$$

Where $\gamma_{lg}$ is a surface tension of the liquid drop 7, $\theta_0$ is an initial contact angle of the liquid drop 7, and $\theta$ is a contact angle of the liquid drop 7 with a voltage applied.

With continued reference to FIG. 7, a component of the dielectrophoretic force in the direction of movement of the liquid drop 7 is an effective driving force, and a line integral of the effective driving force along the contact line P is taken to obtain a total effective driving force $F_e$ along the contact line P at a side as:

$$F_e=\int_l \vec{f}_e\cdot\vec{n}\,dl=w\gamma_{lg}(\cos\theta-\cos\theta_0)$$

Wherein l is the contact line at a side, dl is the unit length of the contact line, $\vec{f}_e$ is a vector representation of the dielectrophoretic force $f_e$, $\vec{n}$ is an unit vector in a driving direction of the liquid drop 7, w is a length of an orthogonal projection of the liquid drop-electrode contact line P on a line (a line parallel to the second direction in FIG. 7) perpendicular to the driving direction (direction to be moved) of the liquid drops 7 (the length may also be referred to as a length of an orthogonal projection of the liquid drop-electrode contact line P in the second direction).

Based on the above formula, it may be seen that the length of the orthographic projection of the liquid drop-electrode contact line P in the second direction is related to the driving capability of the electrode 1 for the liquid drops 7, and the longer the length of the orthographic projection of the liquid drop-electrode contact line P in the second direction is, the stronger the driving capability of the electrode 1 for the liquid drops 7 is. Therefore, the driving capability of the electrode 1 for the liquid drops 7 may be represented by the length of the orthographic projection of the liquid drop-electrode contact line P in the second direction.

In the embodiment of the present disclosure, the driving capability of the leftmost electrode for the liquid drops 7 may be denoted as WL, and the driving capability of the rightmost electrode for the liquid drops 7 may be denoted as WR. In order to increase the driving capability of the electrode for the liquid drops 7, the first/second boundary (boundaries) may be designed accordingly such that WL+WR is as large as possible. In the embodiment of the present disclosure, the distance between the two end points of the first boundary 4*a* in the second direction is smaller than the length of the first boundary 4*a*, such that the value of WL+WR may be increased to some extent, to improve the driving capability of the electrode for the liquid drops 7.

Based on the above description, the embodiment of the present disclosure further provides a method for optimizing the shape of the first electrode 4, so as to optimize the shape of the first boundary 4*a*/the second boundary 4*b* of the first electrode 4.

Figure 8:
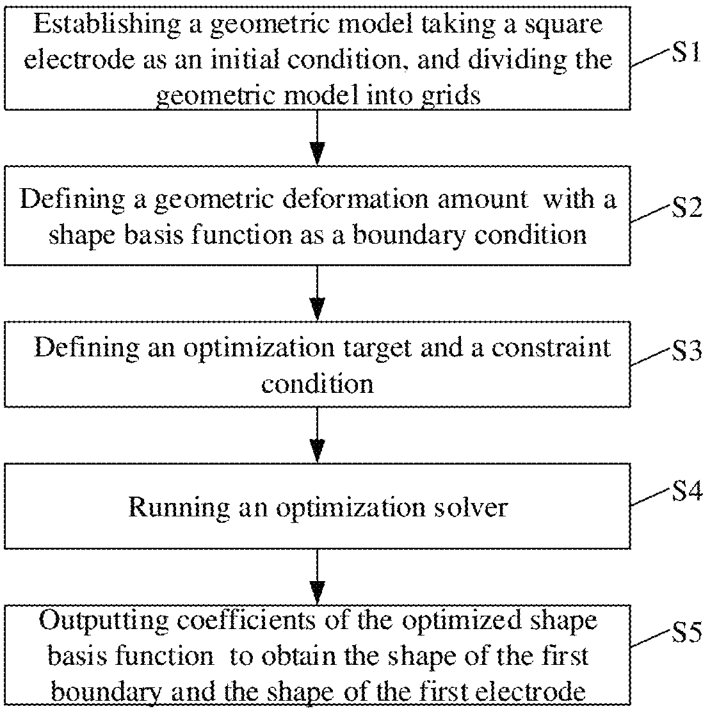
FIG. 8 is a flowchart of an optimization method for the electrode shape according to an embodiment of the present disclosure.

FIG. 8 is a flowchart of an optimization method for the electrode shape according to an embodiment of the present disclosure. As shown in FIG. 8, in the embodiment of the present disclosure, the shape of the first electrode 4 may be optimized based on a finite element analysis method, including following steps:

Step S1, establishing a geometric model taking a square electrode as an initial condition, and dividing the geometric model into grids.

In step S1, a geometric model of the cross-sectional shape of the first electrode 4 parallel to the first base 3 may be established in a modeling module of an analysis software, and the geometric model may be divided into grids. Illustratively, the grid includes three square areas which are arranged along the first direction and at intervals, one square electrode is provided within each square area, side lengths of the square area and the square electrode are set to be L, and an interval between any two adjacent electrodes is set to be z; a position of the contact surface profile R of the liquid drop 7 with the first liquid transmission layer is set (i.e. a center of a circle and a radius of the contact surface profile are determined).

Step S2, defining a geometric deformation amount by a shape basis function as a boundary condition.

In step S2, the shape basis functions of the first boundary 4*a* and the second boundary 4*b* of each first electrode 4 in the geometric model may be defined and the coefficients to be optimized are determined.

In a case of generating the shape basis function of the first boundary 4*a* as an example, the first boundary 4*a* is taken as a reference first boundary; a shape change of the reference first boundary is represented with the shape basis function S (Y, $c_0 \ldots c_n$); wherein Y is a normalized coordinate of a point on the reference first boundary, i.e., a ratio of a position coordinate y (0≤y≤L) of the reference first boundary to the side length L of the electrode, where Y=y/L and 0≤Y≤1. $c_0 \ldots c_n$ are the coefficients to be optimized in the shape basis function.

In the embodiment of the present disclosure, the shape basis function for describing the first boundary 4*a* may be a polynomial function such as a Bernstein function, a Chebyshev function, a Fourier function, and the like, which is not limited in the technical solution of the present disclosure. The shape basis function is a fourth-order Bernstein function, for example.

A straight line passing through a symmetrical center of the reference first boundary and parallel to the second direction is taken as a first coordinate axis (positive and negative directions of the first coordinate axis may be arbitrarily defined), a straight line passing through the first end point N1 in the reference first boundary and parallel to the first direction is taken as a second coordinate axis (positive and negative directions of the first coordinate axis may be arbitrarily defined), and an intersection point of the first coordinate axis and the second coordinate axis is taken as a coordinate origin, thereby obtaining a coordinate system. In the coordinate system, the shape basis function of the reference first boundary may be expressed as:

$$S(Y, c_0 \ldots c_4) = L[c_0(1-Y)^4 + c_1 Y(1-Y)^3 + c_1 Y^2 (1-Y)^2 + c_3 Y^3 (1-Y) + c_4 Y^4] \quad (1)$$

In the same way, the corresponding shape basis functions may be set for both the first boundary 4*a* and the second boundary 4*b* of each first electrode 4 in the geometric model in the same coordinate system. It should be noted that, since any one of the first boundary 4*a* and the second boundary 4*b* in the coordinate system may be obtained by translating the reference first boundary along the first direction, the shape basis functions corresponding to other first boundaries 4*a* and second boundaries 4*b* except the reference first boundary may be expressed as: $S_i$(Y, S (Y, $c_0 \ldots c_4$)=S(Y, $c_0 \ldots c_4$)+$\alpha_i$, where S(Y, $c_0 \ldots c_4$) is the shape basis function of the reference first boundary, $S_i$(Y, $c_0 \ldots c_4$) is shape basis function corresponding to the $i^{th}$ first/second boundary except the reference first boundary, a, is a relative distance (the value may be positive or negative) between the $i^{th}$ first/second boundary except the reference first boundary and the reference first boundary in the first direction.

In the same coordinate system, an equation corresponding to the contact surface profile of the liquid drop 7 with the first liquid transmission layer is obtained.

Step S3, defining an optimization target and a constraint condition.

In step S3, it may be seen from the above description that in order to improve the driving capabilities of the first electrode 4 for the liquid drops 7, a sum of the lengths of two orthographic projections of two liquid drop-electrode contact lines P respectively formed by the liquid drop 7 and the two adjacent first electrodes 4 on the second direction should be maximized A length of an orthographic projection of the liquid drop-electrode contact line P formed by the contact surface profile R of the liquid drop 7 with the first liquid transmission layer and the left adjacent first electrode 4 on the second direction is denoted as WL, a length of an orthographic projection of the liquid drop-electrode contact line P formed by the contact surface profile R of the liquid drop 7 with the first liquid transmission layer and the right adjacent first electrode 4 on the second direction is denoted as WR, and an optimization target may be set as: maximize: WL+WR, the maximize represents maximization.

With the reference first boundary as an object, since the reference first boundary is centrosymmetric, the following two constraint conditions may be set: 1), S(Y)=−S(1−Y); 2), S(Y/2)=0.

Step S4, running an optimization solver.

In step S4, coefficients $c_0 \ldots c_n$ to be optimized in the shape basis function are automatically adjusted by an optimization solving algorithm, so as to obtain a total length of projections of the contact lines, and perform a successive iteration solution until the optimization target value is stably converged, that is, the maximum value of the total length of projections of the contact lines is obtained.

Step S5, outputting the optimized shape basis function coefficients to obtain the shape of the first boundary 4*a* and the shape of the first electrode 4.

In step S5, the solved coefficients $c_0 \ldots c_n$ in the case where WL+WR is maximized are outputted and substituted into the shape basis function of the first boundary 4*a*/the second boundary 4*b*, so that a final shape of the first electrode 4 may be obtained.

Figure 9:
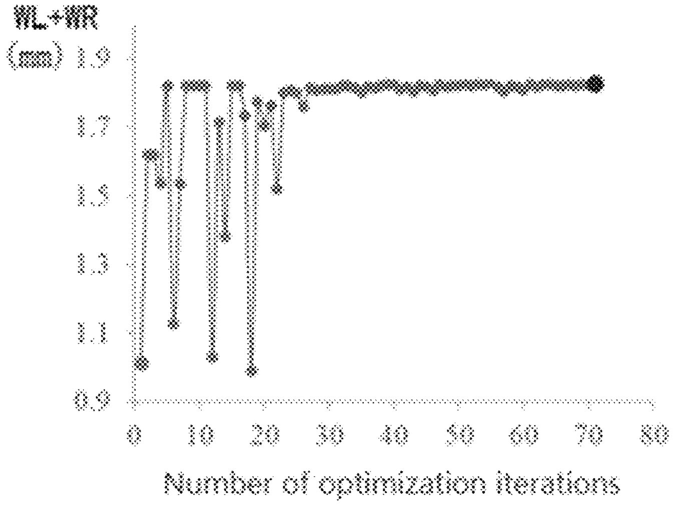
FIG. 9 is a broken-line diagram illustrating different numbers of optimization iterations and their corresponding WL+WR during performing optimization iterations according to an embodiment of the present disclosure.

FIG. 9 is a broken-line diagram illustrating different numbers of optimization iterations and their corresponding WL+WR during performing optimization iterations according to an embodiment of the present disclosure. As shown in FIG. 9, a case is taken as example parameters where the side length of the square area is L=1.4 mm, the interval between any two adjacent electrodes is z=0.1 mm and the contact surface profile R of the liquid drop 7 with the first liquid transmission layer is circular and has a diameter d=1.68 mm; modeling and optimizing are carried out in finite element analysis software. The output result shows that before optimization (the optimization iteration number is 0), when the electrode adopts a square electrode in the related art, WL+WR is approximately equal to 1.01 mm. That is, WL=WR, and both WL and WR are approximately equal to 0.5005 mm; after the optimization is completed (the value of WL+WR appears to converge when the number of iterations reaches about 70), the software outputs $C_0$=—$C_4$=0.3, $C_2$=0, $C_1$=−$C_3$=−0.61, and the shape of the corresponding first electrode 4 is as shown in FIGS. 5 and 6, at this time, WL+WR is approximately equal to 1.83 mm. That is, WL=WR, and both WL and WR are approximately equal to 0.915 mm. As may be seen from the examples, compared with the case before optimization, the WL+WR is increased by 81.2% after the optimization is completed, significantly improving the driving capability of the first electrode 4 for the liquid drops 7.

It should be noted that, in the embodiment of the present disclosure, the manner of optimizing the first boundary 4*a* in the first electrode 4 is not limited to the above finite element analysis method. In practical applications, a plurality of sets of coefficients to be optimized may be selected by adopting methods such as an incomplete induction method, a random test method, an orthogonal test method and the like, and an optimal value may be induced and selected from the selected sets of coefficients. The details are not described in detail here.

In some embodiments, during moving along the first boundary 4*a* from the first end point N1 to the second end point N2, a distance of a point on the first boundary 4*a* away from a virtual reference line increases gradually or in steps. Alternatively, during moving along the first boundary 4*a* from the first end point N1 to the second end point N2, the distance of the point on the first boundary 4*a* away from the virtual reference line decreases gradually or in steps. The virtual reference line passes through a symmetrical center of the cross-sectional shape and is parallel to the second direction.

With continued reference to FIG. 6, in some embodiments, the first boundary 4*a* is shaped as an S-curve or a symmetrical S-curve.

Figure 10:
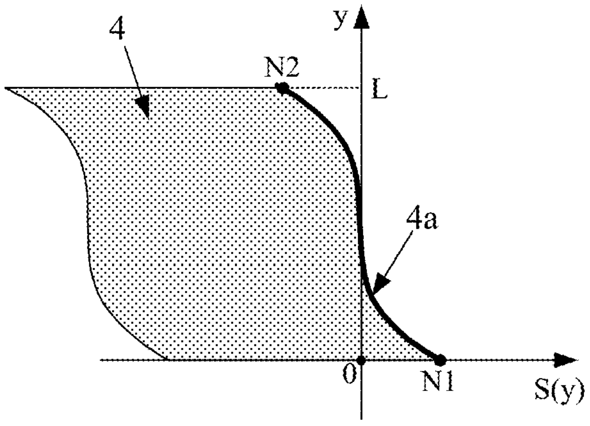
FIG. 10 is a schematic diagram of a first electrode with a first boundary having a symmetrical S-shaped curve in a predetermined planar rectangular coordinate system according to an embodiment of the present disclosure.

FIG. 10 is a schematic diagram of a first electrode with a first boundary having a symmetrical S-shaped curve in a predetermined planar rectangular coordinate system according to an embodiment of the present disclosure. As shown in FIG. 10, as a specific alternative embodiment, in the predetermined planar rectangular coordinate system, a curve function corresponding to the first boundary 4*a* is:

$$S(y) = L*\left\{0.3*\left[1-\left(\frac{y}{L}\right)\right]^4 - 0.61*\left(\frac{y}{L}\right)\left[1-\left(\frac{y}{L}\right)\right]^3 + 0.61*\left(\frac{y}{L}\right)^3\left[1-\left(\frac{y}{L}\right)\right] - 0.3*\left(\frac{y}{L}\right)^4\right\} \quad (2)$$

or, $$S(y) = -L*\left\{0.3*\left[1-\left(\frac{y}{L}\right)\right]^4 - 0.61*\left(\frac{y}{L}\right)\left[1-\left(\frac{y}{L}\right)\right]^3 + 0.61*\left(\frac{y}{L}\right)^3\left[1-\left(\frac{y}{L}\right)\right] - 0.3*\left(\frac{y}{L}\right)^4\right\} \quad (3)$$

A first coordinate axis in the predetermined planar rectangular coordinate system passes through the symmetrical center of the first boundary 4*a* and is parallel to the second direction, a second coordinate axis in the predetermined planar rectangular coordinate system passes through the first end point N1 and is parallel to the first direction, y and S (y) are coordinate values corresponding to the first coordinate axis and the second coordinate axis respectively corresponding to points on the first boundary 4*a*, 0≤y≤1, and L is a distance between the first end point N1 and the second end point N2 in the second direction. It should be noted that in the example, a vertical direction is a positive direction of the first coordinate axis, and a horizontal direction towards the right is a positive direction of the second coordinate axis.

It should be noted that the above formula (2) is obtained by substituting C0=−C4=0.3, C2=0, C1=−C3=−0.61 into the formula (1), a curve corresponding to the formula (2) is a symmetrical S-curve; a curve corresponding to the formula (3) and the curve corresponding to the formula (2) are symmetric with respect to the first coordinate axis, and the curve corresponding to the formula (3) is an S-curve, in which case no corresponding figure is given. It may be seen from the above description that when the first boundary 4*a* in the first electrode 4 adopts the curve functions of formulas (2) and (3), the driving capability of the first electrode 4 for the liquid drops 7 may be significantly improved.

Figure 11:
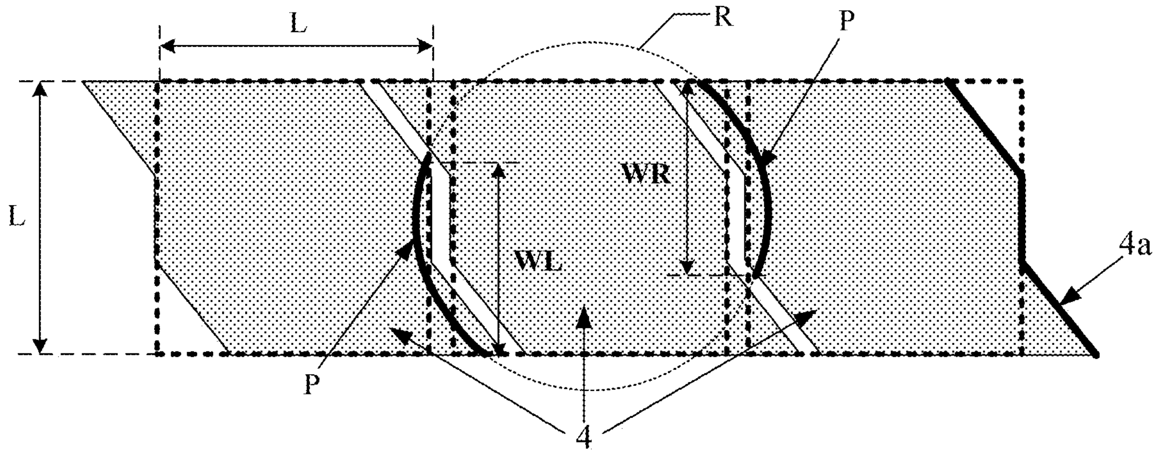
FIG. 11 is a schematic top view of three first electrodes that are arranged side by side in a microfluidic chip according to an embodiment of the present disclosure.

FIG. 11 is a schematic top view of three first electrodes that are arranged side by side in a microfluidic chip according to an embodiment of the present disclosure. As shown in FIG. 11, unlike the shape of the first boundary 4*a* of the first electrode 4 being the S-curve or the symmetrical S-curve shown in FIG. 6, a shape of the first boundary 4*a* of the first electrode 4 shown in FIG. 11 is a broken line, which includes: a first line segment, a second line segment and a third line segment connected in sequence; the second line segment is parallel to the second direction. The first boundary 4*a* in the shape of the broken line may also improve the driving capabilities of the first electrode 4 for the liquid drops 7 to some extent.

The contact surface profile R of the liquid drop 7 with the first liquid transmission layer forms liquid drop-electrode contact lines P with the two adjacent first electrodes 4, and a length of an orthographic projection of the liquid drop-electrode contact line P on the left side on the second direction is WL, and a length of an orthographic projection of the liquid drop-electrode contact line P on the right side on the second direction is WR.

Figure 12:
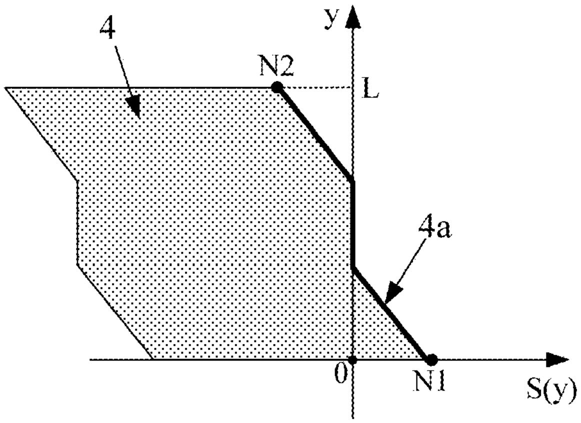
FIG. 12 is a schematic diagram of a first electrode with a first boundary having a polygonal line shape in a predetermined planar rectangular coordinate system according to an embodiment of the present disclosure.

FIG. 12 is a schematic diagram of a first electrode with a first boundary having a polygonal line shape in a predetermined planar rectangular coordinate system according to an embodiment of the present disclosure. As shown in FIG. 12, as a specific alternative embodiment, in the predetermined planar rectangular coordinate system, a curve function corresponding to the first boundary 4*a* is:

$$S(y) = \begin{cases} L*\left[\frac{3}{10} - \frac{6}{7}*\left(\frac{y}{L}\right)\right] & 0 \le y < \frac{7}{20}L \\ 0 & \frac{7}{20}L \le y < \frac{13}{20}L \\ -L*\left[\frac{3}{10} - \frac{6}{7}*\left(1-\frac{y}{L}\right)\right] & \frac{13}{20}L \le y \le L \end{cases} \quad (4)$$

or, $$S(y) = \begin{cases} -L*\left[\frac{3}{10} - \frac{6}{7}*\left(\frac{y}{L}\right)\right] & 0 \le y < \frac{7}{20}L \\ 0 & \frac{7}{20}L \le y < \frac{13}{20}L \\ L*\left[\frac{3}{10} - \frac{6}{7}*\left(1-\frac{y}{L}\right)\right] & \frac{13}{20}L \le y \le L \end{cases} \quad (5)$$

A first coordinate axis in the predetermined planar rectangular coordinate system passes through the symmetrical center of the first boundary 4*a* and is parallel to the second direction, a second coordinate axis in the predetermined planar rectangular coordinate system passes through the first end point N1 and is parallel to the first direction, y and S (y) are coordinate values corresponding to the first coordinate axis and the second coordinate axis respectively corresponding to points on the first boundary 4*a*, and L is a distance between the first end point N1 and the second end point N2 in the second direction. It should be noted that in the example, a vertical direction is a positive direction of the first coordinate axis, and a horizontal direction towards the right is a positive direction of the second coordinate axis.

It should be noted that FIG. 12 exemplarily shows that the first boundary 4*a* adopts a curve function shown in formula (4); the broken line corresponding to formula (5) is symmetrical to the broken line corresponding to formula (4) about the first coordinate axis, and no corresponding figure is shown in this case.

Figure 13:
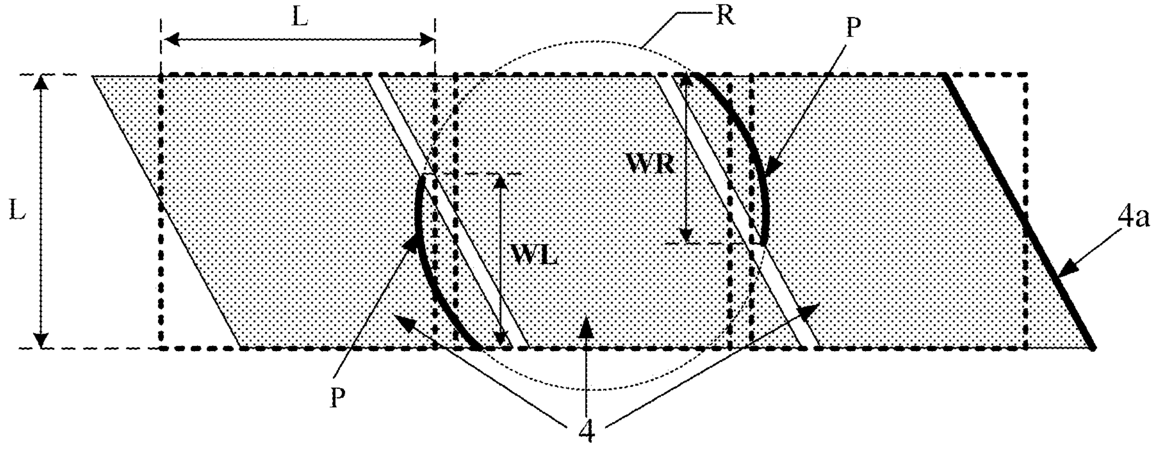
FIG. 13 is a schematic top view of three first electrodes that are arranged side by side in a microfluidic chip according to an embodiment of the present disclosure.

FIG. 13 is a schematic top view of three first electrodes which are arranged side by side in a microfluidic chip according to an embodiment of the present disclosure. As shown in FIG. 13, unlike the shape of the first boundary 4*a* of the first electrode 4 being the S-curve or the symmetrical S-curve shown in FIG. 6, and unlike the shape of the first boundary 4*a* of the first electrode 4 being the broken line shown in FIG. 11, a shape of the first boundary 4*a* of the first electrode 4 shown in FIG. 13 is a line segment, and an extension direction of the line segment intersects with the second direction. The first boundary 4*a* may also improve the driving capabilities of the first electrode 4 for the liquid drops 7 to some extent.

The contact surface profile R of the liquid drop 7 with the first liquid transmission layer forms liquid drop-electrode contact lines P with the two adjacent first electrodes 4, and a length of an orthographic projection of the liquid drop-electrode contact line P on the left side on the second direction is WL, and a length of an orthographic projection of the liquid drop-electrode contact line P on the right side on the second direction is WR.

Figure 14:
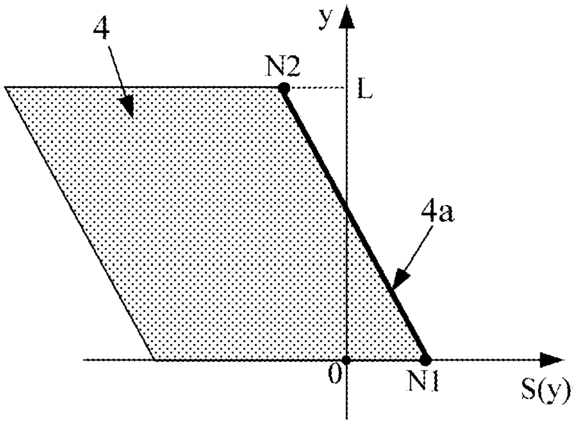
FIG. 14 is a schematic diagram of a first electrode with a first boundary having a line segment shape in a predetermined planar rectangular coordinate system according to an embodiment of the present disclosure.

FIG. 14 is a schematic diagram of a first electrode with a first boundary having a line segment shape in a predetermined planar rectangular coordinate system according to an embodiment of the present disclosure. As shown in FIG. 14, as a specific alternative embodiment, in the predetermined planar rectangular coordinate system, a curve function corresponding to the first boundary 4*a* is:

$$S(y) = L*\left(\frac{3}{10} - \frac{3}{5}*\left(\frac{y}{L}\right)\right) \quad (6)$$

or, $$S(y) = -L*\left(\frac{3}{10} - \frac{3}{5}*\left(\frac{y}{L}\right)\right) \quad (7)$$

A first coordinate axis in the predetermined planar rectangular coordinate system passes through the symmetrical center of the first boundary 4*a* and is parallel to the second direction, a second coordinate axis in the predetermined planar rectangular coordinate system passes through the first end point N1 and is parallel to the first direction, y and S (y) are coordinate values corresponding to the first coordinate axis and the second coordinate axis respectively corresponding to points on the first boundary 4*a*, 0≤y≤1, and L is a distance between the first end point N1 and the second end point N2 in the second direction. It should be noted that in the example, a vertical direction is a positive direction of the first coordinate axis, and a horizontal direction towards the right is a positive direction of the second coordinate axis.

It should be noted that FIG. 12 exemplarily shows that the first boundary 4*a* adopts a curve function shown in formula (6); the line segment corresponding to formula (7) is symmetrical to the line segment corresponding to formula (6) about the first coordinate axis, and no corresponding figure is shown in this case.

It should be noted that the first substrate 2 shown in FIG. 4 may be a complete microfluidic chip, and an electric field may be formed between adjacent first electrodes 4 in the first electrode layer to drive the liquid drops 7. Alternatively, the first substrate 2 in FIG. 4 may also be a part of a microfluidic chip, and may form a complete microfluidic chip with an opposite second substrate 8.

Figure 15:
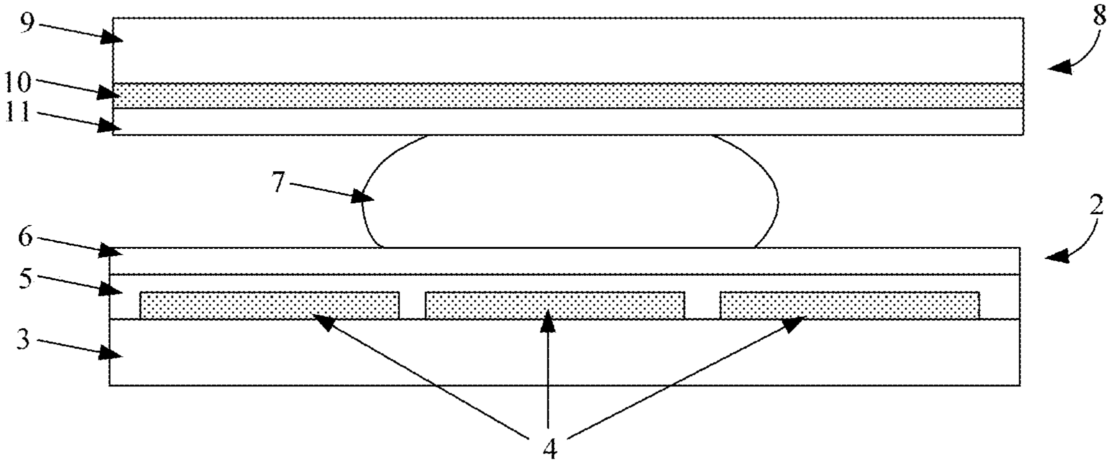
FIG. 15 is a schematic structural diagram of a microfluidic chip according to an embodiment of the present disclosure.

FIG. 15 is a schematic structural diagram of another microfluidic chip according to an embodiment of the present disclosure. As shown in FIG. 15, the microfluidic chip according to the embodiment includes not only the first substrate 2, but also the second substrate 8 disposed opposite to the first substrate 2, and the first electrode layer is located on a side of the first base 3 proximal to the second substrate 8. For a specific description of the first substrate 2, reference may be made to the contents in the above embodiments, and details are not repeated herein.

The second substrate 8 includes: a second base, a second electrode layer 9 located on a side of the second substrate 8 proximal to the first substrate 2, and a second lyophobic layer 10 located on a side of the second electrode layer 9 proximal to the first substrate 2. In some embodiments, the second electrode layer 9 may be a planar second electrode or a plurality of striped second electrodes. An electric field may be formed between the first electrode 4 and the second electrode to drive the liquid drops 7.

The embodiments of the present disclosure further provide a microfluidic system, where the microfluidic system includes a microfluidic chip, which is the microfluidic chip provided in the above embodiments, and for specific description of the microfluidic chip, reference may be made to the contents in the foregoing embodiments, and details are not repeated here.

In some embodiments, a contact surface of the liquid drops which are controlled by the microfluidic chip to flow with the first substrate has a circular shape and a diameter d; a distance between the first boundary 4*a* and the second boundary 4*b* on the first electrode in the first direction is L, wherein L and d satisfy:

$$1.15 \leq \frac{d}{L} \leq 1.25$$

For example, $$\frac{d}{L}$$

has a value of 1.2. In the practical application, $$\frac{d}{L}$$

may be set and adjusted according to actual needs.

As a specific example, the microfluidic System is a Micro-Total Analysis System (MTAS), which may control the movement, separation, polymerization, chemical reaction, and biological detection of micro liquid drops. The MTAS includes the microfluidic chip and an optical unit.

It will be understood that the above embodiments are merely exemplary embodiments employed to illustrate the principles of the present disclosure. However, the present disclosure is not limited thereto. It will be apparent to one skill in the art that various changes and modifications may be made therein without departing from the spirit and scope of the present disclosure, and these changes and modifications are to be considered within the scope of the present disclosure.

What is claimed is:

1. A microfluidic chip, comprising a first substrate; wherein the first substrate comprises a first base and a first electrode layer on the first base; the first electrode layer comprises a plurality of first electrodes arranged at intervals along a first direction, wherein a cross-sectional shape of the first electrode parallel to the first base is a centrosymmetric shape, and the cross-sectional shape comprises a first boundary and a second boundary opposite to each other in the first direction;

a shape of the first boundary is a centrosymmetric curve, a distance between two end points of the first boundary in a second direction perpendicular to the first direction is less than a length of the first boundary; and the second boundary has a same shape and length as the first boundary, and the first boundary and the second boundary are parallel to each other in the first direction.

2. The microfluidic chip according to claim 1, wherein two end points of the first boundary are a first end point and a second end point, respectively, two end points of the second boundary are a third end point and a fourth end point, respectively, a first connection line connecting the first end point to the third end point is parallel to the first direction, and a second connection line connecting the second end point to the fourth end point is parallel to the first direction; and the cross-sectional shape of the first electrode parallel to the first base further comprises: a third boundary and a fourth boundary opposite to each other in the second direction, wherein the third boundary is a line segment connecting the first end point to the third end point, and the fourth boundary is a line segment connecting the second end point to the fourth end point.

3. The microfluidic chip according to claim 2, wherein a distance between the first end point and the third end point is a first distance;

a distance between the first end point and the second end point in the second direction is a second distance; and the first distance is equal to the second distance.

4. The microfluidic chip according to claim 1, wherein two end points of the first boundary are a first end point and a second end point, respectively;

an extension direction of a third connection line connecting the first end point to the second end point intersects with the second direction.

5. The microfluidic chip according to claim 4, wherein during moving along the first boundary from the first end point to the second end point, a point on the first boundary has a distance away from a virtual reference line and the distance increases gradually or in steps; or during moving along the first boundary from the first end point to the second end point, a point on the first boundary has a distance away from a virtual reference line and the distance decreases gradually or in steps;

wherein the virtual reference line passes through a symmetrical center of the cross-sectional shape and is parallel to the second direction.

6. The microfluidic chip according to claim 5, wherein the first boundary has an S-curve or a symmetrical S-curve.

7. The microfluidic chip according to claim 6, wherein in a predetermined rectangular plane coordinate system, a curve function corresponding to the first boundary is:

$$S(y) = L*$$

$$\left\{0.3*\left[1-\left(\frac{y}{L}\right)\right]^4-0.61*\left(\frac{y}{L}\right)\left[1-\left(\frac{y}{L}\right)\right]^3+0.61*\left(\frac{y}{L}\right)^3\left[1-\left(\frac{y}{L}\right)\right]-0.3*\left(\frac{y}{L}\right)^4\right\}$$

or, $$S(y) = -L*\Big\{0.3*\left[1-\left(\frac{y}{L}\right)\right]^4 -$$

$$0.61*\left(\frac{y}{L}\right)\left[1-\left(\frac{y}{L}\right)\right]^3+0.61*\left(\frac{y}{L}\right)^3\Big[1-\left(\frac{y}{L}\right)^3\left[1-\left(\frac{y}{L}\right)\right]-0.3*\left(\frac{y}{L}\right)^4\Big\}$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values on the first coordinate axis and the second coordinate axis respectively corresponding to points on the first boundary, 0≤y≤1, and L is a distance between the first end point and the second end point in the second direction.

8. The microfluidic chip according to claim 5, wherein the first boundary has a shape of a broken line, which comprises: a first line segment, a second line segment and a third line segment connected in sequence; and the second line segment is parallel to the second direction.

9. The microfluidic chip according to claim 8, wherein in the predetermined rectangular plane coordinate system, a curve function corresponding to the first boundary is:

$$S(y) = \begin{cases} L*\left[\frac{3}{10}-\frac{6}{7}*\left(\frac{y}{L}\right)\right] & 0 \le y < \frac{7}{20}L \\ 0 & \frac{7}{20}L \le y < \frac{13}{20}L \\ -L*\left[\frac{3}{10}-\frac{6}{7}*\left(1-\frac{y}{L}\right)\right] & \frac{13}{20}L \le y \le L \end{cases}$$

or, $$S(y) = \begin{cases} -L*\left[\frac{3}{10}-\frac{6}{7}*\left(\frac{y}{L}\right)\right] & 0 \le y < \frac{7}{20}L \\ 0 & \frac{7}{20}L \le y < \frac{13}{20}L \\ L*\left[\frac{3}{10}-\frac{6}{7}*\left(1-\frac{y}{L}\right)\right] & \frac{13}{20}L \le y \le L \end{cases}$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values on the first coordinate axis and the second coordinate axis respectively corresponding to points on the first boundary, and L is a distance between the first end point and the second end point in the second direction.

10. The microfluidic chip according to claim 5, wherein the first boundary has a shape of a line segment.

11. The microfluidic chip according to claim 8, wherein in the predetermined rectangular plane coordinate system, a curve function corresponding to the first boundary is:

$$S(y) = L * \left[\frac{3}{10} - \frac{3}{5} * \left(\frac{y}{L}\right)\right]$$

or, $$S(y) = -L * \left[\frac{3}{10} - \frac{3}{5} * \left(\frac{y}{L}\right)\right]$$

wherein a first coordinate axis in the predetermined planar rectangular coordinate system passes through the symmetrical center of the first boundary and is parallel to the second direction, a second coordinate axis in the predetermined planar rectangular coordinate system passes through the first end point and is parallel to the first direction, y and S (y) are coordinate values on the first coordinate axis and the second coordinate axis respectively corresponding to points on the first boundary, 0≤y≤1, and L is a distance between the first end point and the second end point in the second direction.

12. The microfluidic chip according to claim 1, further comprising: a dielectric layer on a side of the first electrode layer distal to the first base, and a first lyophobic layer on a side of the dielectric layer distal to the first base.

13. The microfluidic chip according to claim 1, further comprising a second substrate opposite to the first substrate, wherein the first electrode layer is on a side of the first base proximal to the second substrate; and the second substrate comprises a second base, a second electrode layer on a side of the second substrate proximal to the first substrate, and a second lyophobic layer on a side of the second electrode layer proximal to the first substrate.

14. A microfluidic system, comprising: the microfluidic chip according to claim 1.

15. The microfluidic system according to claim 14, wherein the microfluidic chip is configured to control a flow of a liquid drop, and a contact surface of the liquid drop with the first substrate has a circular shape and a diameter d; and a distance between the first boundary and the second boundary in the first direction is L, and L and d satisfy:

$$1.15 \leq \frac{d}{L} \leq 1.25.$$

16. The microfluidic system according to claim 14, wherein two end points of the first boundary are a first end point and a second end point, respectively, two end points of the second boundary are a third end point and a fourth end point, respectively, a connection line connecting the first end point to the third end point is parallel to the first direction, and a connection line connecting the second end point to the fourth end point is parallel to the first direction; and the cross-sectional shape of the first electrode parallel to the first base further comprises: a third boundary and a fourth boundary opposite to each other in the second direction, wherein the third boundary is a line segment connecting the first end point to the third end point, and the fourth boundary is a line segment connecting the second end point to the fourth end point.

17. The microfluidic system according to claim 16, wherein a distance between the first end point and the third end point is a first distance;

a distance between the first end point and the second end point in the second direction is a second distance; and the first distance is equal to the second distance.

18. The microfluidic system according to claim 14, wherein two end points of the first boundary are a first end point and a second end point, respectively;

an extension direction of a connection line connecting the first end point to the second end point intersects with the second direction.

19. The microfluidic system according to claim 18, wherein during moving along the first boundary from the first end point to the second end point, a point on the first boundary has a distance away from a virtual reference line and the distance increases gradually or in steps; or during moving along the first boundary from the first end point to the second end point, a point on the first boundary has a distance away from a virtual reference line and the distance decreases gradually or in steps;

wherein the virtual reference line passes through a symmetrical center of the cross-sectional shape and is parallel to the second direction.

20. The microfluidic system according to claim 19, wherein the first boundary has an S-curve or a symmetrical S-curve.

* * * * *